United States Patent
Jeong et al.

(10) Patent No.: US 8,766,934 B2
(45) Date of Patent: Jul. 1, 2014

(54) METHOD FOR DISPLAYING A MENU IN MOBILE TERMINAL AND MOBILE TERMINAL THEREOF

(75) Inventors: Kyesook Jeong, Seoul (KR); Inyoung Hwang, Seoul (KR); Meeyeon Choi, Seoul (KR); Jungseok Hong, Seoul (KR); Hyunsuk Jung, Seoul (KR); Byoungnam Lee, Seoul (KR); Harim Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 376 days.

(21) Appl. No.: 12/902,021

(22) Filed: Oct. 11, 2010

(65) Prior Publication Data

US 2011/0096006 A1 Apr. 28, 2011

(30) Foreign Application Priority Data

Oct. 27, 2009 (KR) .......................... 10-2009-0102329

(51) Int. Cl.
*G06F 3/041* (2006.01)

(52) U.S. Cl.
USPC ........... 345/173; 345/174; 345/179; 345/156; 345/424; 345/419; 178/18.01; 178/18.09; 382/106; 382/15; 715/836

(58) Field of Classification Search
USPC ......... 345/352–359, 184, 173, 174, 179, 424, 345/419; 384/13, 10; 178/18.01–18.09; 715/836; 382/154, 106
See application file for complete search history.

(56) References Cited

U.S. PATENT DOCUMENTS

| | | | |
|---|---|---|---|
| 6,236,398 B1 * | 5/2001 | Kojima et al. | 345/419 |
| 2003/0156146 A1 | 8/2003 | Suomela et al. | |
| 2006/0020888 A1 * | 1/2006 | Kang et al. | 715/708 |
| 2007/0124699 A1 | 5/2007 | Michaels | |

FOREIGN PATENT DOCUMENTS

| | | |
|---|---|---|
| CN | 1761340 | 4/2006 |
| CN | 101478605 | 7/2009 |
| EP | 1396985 | 3/2004 |
| WO | 2007/042857 | 4/2007 |

OTHER PUBLICATIONS

European Patent Office Application Serial No. 10187199.4, Search Report dated Jun. 4, 2013, 6 pages.

* cited by examiner

*Primary Examiner* — Shaheda Abdin
(74) *Attorney, Agent, or Firm* — Lee, Hong, Degerman, Kang & Waimey (57) ABSTRACT

A mobile terminal includes at least a display unit, a sensing unit, and a controller. The display unit includes a touch screen and displays at least two three-dimensional (3D) menu icons and each of the at least two 3D menu icons includes at least one menu. The display unit further displays a first menu on a first display surface of each of the at least two 3D menu icons, the first menu on each of the at least two 3D menu icons being different. The sensing unit detects an input for controlling at least one of the at least two 3D menu icons. The controller controls the display unit to display a second menu on a second display surface of each of the at least two 3D menu icons in response to the detected input. Each of the at least two 3D menu icons displayed on the display unit includes at least two display surfaces, each of the at least two display surfaces displaying a different menu.

20 Claims, 10 Drawing Sheets

METHOD FOR DISPLAYING A MENU IN MOBILE TERMINAL AND MOBILE TERMINAL THEREOF

CROSS REFERENCE TO RELATED APPLICATIONS

Pursuant to 35 U.S.C. §119 (a), this application claims the benefit of earlier filing date and right of priority to Korean Patent Application No. 10-2009-0102329, filed on Oct. 27, 2009, the contents of which are hereby incorporated by reference in their entirety.

FIELD OF THE DISCLOSURE

The present disclosure relates to a method for displaying a menu in a mobile terminal configured to switch from one display surface to another display surface of a 3-dimensional (3D) menu icon displayed on a display unit of the mobile terminal in response to user input and a mobile terminal performing the method.

DESCRIPTION OF THE RELATED ART

Generally, terminals can be classified into mobile/portable terminals and stationary terminals. The mobile terminals can be further classified into handheld terminals and vehicle mountable terminals according to their modes of portability.

As functions of the terminal are diversified, the terminal may be implemented as a multimedia player provided with composite functions such as photographing of photos or moving pictures, playback of music or moving picture files, game play, broadcast reception and the like. To implement the complex functions in the multimedia player, improvement of structural parts and/or software parts of the terminal may be necessary. Recently, concomitant with enablement of multitask functions, various input methods have been developed for conveniently implementing multiple functions at the same time.

SUMMARY OF THE DISCLOSURE

The present disclosure provides a method for displaying a menu configured for a user to more conveniently select a desired menu.

According to an embodiment of the present disclosure, a method for displaying a menu in a mobile terminal includes displaying at least two three-dimensional (3D) menu icons on a display unit, each of the at least two 3D menu icons including at least one menu; displaying a first menu on a first display surface of each of the at least two 3D menu icons, the first menu on each of the at least two 3D menu icons being different; detecting an input received via a touch screen; and displaying a second menu on a second display surface of each of the at least two 3D menu icons in response to the detected input.

According to another embodiment of the present disclosure, a mobile terminal includes a display unit which includes a touch screen and is configured to display at least two three-dimensional (3D) menu icons, each of the at least two 3D menu icons including at least one menu. The display unit further displays a first menu on a first display surface of each of the at least two 3D menu icons, the first menu on each of the at least two 3D menu icons being different. The mobile terminal further includes a sensing unit which detects an input for controlling at least one of the at least two 3D menu icons and a controller which controls the display unit to display a second menu on a second display surface of each of the at least two 3D menu icons in response to the detected input, each of the at least two 3D menu icons including at least two display surfaces, each of the at least two display surfaces displaying a different menu.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawings.

DETAILED DESCRIPTION OF PREFERRED EMBODIMENTS

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal. However, such teachings may apply equally to other types of terminals such as stationary terminals that include digital TVs and desktop computers, the details of which are well known to the persons in the art.

Figure 1:
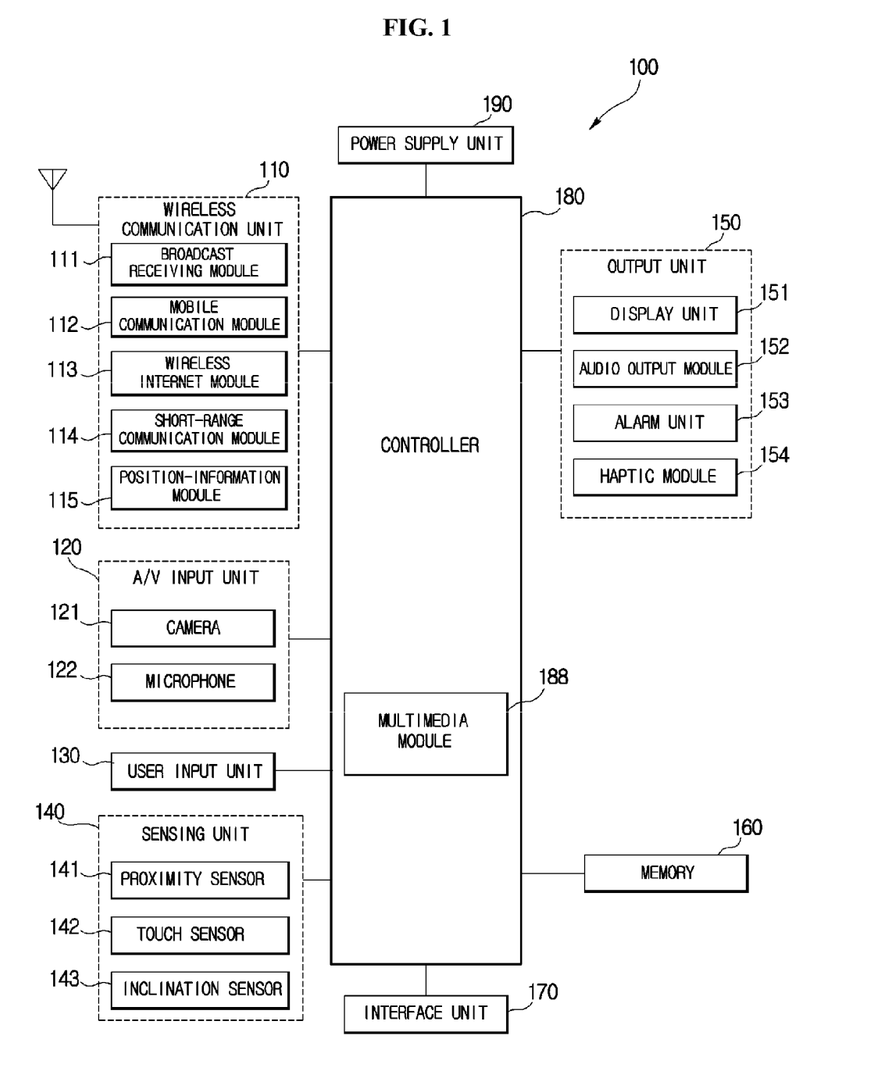
FIG. 1 is a block diagram of a mobile terminal according to an embodiment of the present disclosure.

FIG. 1 shows a mobile terminal 100 having various components. More or less components may alternatively be implemented. Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180 and a power supply unit 190. All the constituent elements shown in FIG. 1 may not be essential such that other mobile terminals may be implemented with fewer elements or more elements than are shown in FIG. 1.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115.

The broadcast receiving module 111 may receive a broadcast signal and/or broadcast associated information from an external broadcast managing entity via a broadcast channel. The broadcast channel may include a satellite channel and a terrestrial channel.

The broadcast managing entity may refer to a system that transmits a broadcast signal and/or broadcast associated information. The broadcast managing entity may also refer to a server configured to generate and transmit a broadcast signal and/or broadcast associated information, or a server configured to receive pre-generated broadcast signal and/or broadcast associated information and to transmit the signal or information to the mobile terminal 100.

The broadcast associated information may refer to information related to a broadcast channel, a broadcast program or a broadcast service provider. The broadcast associated information may be provided through the mobile terminal 100. In this case, the broadcast associated information may be received by the mobile communication module 112.

Examples of the broadcast associated information may include information associated with a broadcast channel, a broadcast program, and a broadcast service provider. Specifically, the broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T).

The broadcast receiving module 111 may be configured to operate with the digital broadcast system and other broadcast systems as well. The broadcast signal and/or broadcast associated information received by the broadcast receiving module 111 may be stored in the memory 160.

The mobile communication module 112 may communicate wireless signals with one or more network entities such as a base station, an external terminal, or a server. The wireless signals may represent audio, video, multimedia, control signaling, and data.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN or Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth™ and ZigBee™.

The position-location module 115 may identify or otherwise obtain a location of the mobile terminal 100. The position-location module 115 may be provided using global positioning system (GPS) components that cooperate with associated satellites, network components, and/or combinations thereof.

Still referring to FIG. 1, the audio/video (A/V) input unit 120 may provide audio or video signals input to the mobile terminal 100. The A/V input unit 120 may include a camera 121 and a microphone 122.

The camera 121 may receive and process image frames of still pictures and/or video. The processed image frames of still pictures and/or video may be displayed on a display unit 151. The image frames processed by the camera 121 may be stored in the memory 160 or may be transmitted to the outside via the wireless communication unit 110. Two or more cameras may be provided to the mobile terminal 100.

The microphone 122 may receive an external audio signal while the mobile terminal 100 is in a particular mode, such as a phone call mode, a recording mode and/or a voice recognition mode. The received audio signal may then be processed and converted into digital data. The mobile terminal 100, and in particular the A/V input unit 120, may include a noise removing algorithm (or noise canceling algorithm) to remove noise generated in the course of receiving the external audio signal.

Furthermore, the microphone 122 may function as an audio sensor in the present disclosure. For example, when a user hits the mobile terminal 100, the microphone 122 may detect vibrations generated by the hitting of the mobile terminal to recognize a user operation of the mobile terminal 100. A shock sensor may replace the microphone 122. The microphone 122 and the shock sensor may replace the sensing unit 140 to detect the user operation to the mobile terminal 100.

The user input unit 130 may generate input data responsive to user manipulation of an associated input device or devices. Examples of such devices may include a keypad, a dome switch, a touchpad (static pressure or capacitance), a jog wheel and/or a jog switch.

The sensing unit 140 may provide status measurements of various aspects of the mobile terminal 100. For example, the sensing unit 140 may detect an open/close status (or state) of the mobile terminal 100, a relative positioning of components, such as a display and a keypad, of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply unit 190, presence or absence of a coupling or other connection between the interface unit 170 and an external device. The sensing unit 140 may include a proximity sensor 141, a touch sensor 142 and/or an inclination sensor 143.

The output unit 150 may generate an output relevant to a sight sense, an auditory sense, a tactile sense and/or the like. The output unit 150 may include a display unit 151, an audio output module 152, an alarm unit 153, and a haptic module 154.

The display unit 151 may display or output information processed by the mobile terminal 100. For example, when the mobile terminal 100 is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include at least one of a liquid crystal display (LCD), a thin film transistor liquid crystal display (TFT LCD), an organic light-emitting diode (OLED), a flexible display, and a 3-dimensional display. The display unit 151 may have a transparent or light-transmissive type configuration to enable an external environment to be seen through. This may be called a transparent display.

A transparent OLED (TOLED) may be an example of a transparent display. A backside structure of the display unit 151 may also have the light-transmissive type configuration. In this configuration, a user may see an object located behind the terminal body through the area occupied by the display unit 151 of the terminal body.

At least two or more display units 151 may also be provided according to a configuration of the mobile terminal 100. For example, a plurality of display units 151 may be provided on a single face of the mobile terminal 100 by being built in one body or spaced apart from the single face. Alternatively, each of a plurality of display units 151 may be provided on different faces of the mobile terminal 100.

If the display unit 151 and a sensor for detecting a touch action (hereinafter a touch sensor) are constructed in a mutual-layered structure (hereinafter a touch screen), the display unit 151 may be used as an input device as well as an output device. For example, the touch sensor 142 may include a touch film, a touch sheet, a touchpad and/or the like.

The touch sensor 142 may convert a pressure applied to a specific portion of the display unit 151 or a variation of electrostatic capacity generated from a specific portion of the display unit 151 to an electrical input signal. The touch sensor 142 may detect a pressure of a touch as well as a position and size of the touch.

If a touch input is provided to the touch sensor 142, signal (s) corresponding to the touch input may be transferred to a touch controller (not shown). The touch controller may process the signal(s) and then transfer corresponding data to the controller 180. The controller 180 may therefore know which portion of the display unit 151 is touched.

The proximity sensor 141 can be provided within the mobile terminal 100 enclosed by the touch-screen or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen is an electrostatic type, the proximity sensor 141 may detect proximity of a pointer using a variation of an electric field according to the proximity of the pointer. In this case, the touch screen (touch sensor) may be classified into the proximity sensor 141.

An action in which a pointer approaches the touch screen without contacting the touch screen may be called a "proximity touch." An action in which a pointer actually touches the touch screen may be called a "contact touch." The location of the touch screen proximity-touched by the pointer may be the position of the pointer that vertically opposes the touch screen when the pointer performs the proximity touch.

The proximity sensor 141 may detect a proximity touch and/or a proximity touch pattern such as a proximity touch distance, a proximity touch duration, a proximity touch position, and a proximity touch shift state. Information corresponding to the detected proximity touch action and/or the detected proximity touch pattern may be output to the touch screen.

The audio output module 152 may output audio data that is received from the wireless communication unit 110 in a call signal reception mode, a call mode, a recording mode, a voice recognition mode, or a broadcast receiving mode. The audio output module 152 may output audio data stored in the memory 160. The audio output module 152 may output an audio signal, such as a call signal receiving sound or a message receiving sound, relevant to a function, performed by the mobile terminal 100. The audio output module 152 may include a receiver, a speaker, a buzzer and/or the like.

The alarm unit 153 may output a signal for announcing an event occurrence of the mobile terminal 100. An event occurring in the mobile terminal 100 may include one of a call signal reception, a message reception, a key signal input, a touch input and/or the like.

The alarm unit 153 may output a signal for announcing an event occurrence by way of vibration or the like as well as a video signal or an audio signal. The video signal may be output via the display unit 151. The audio signal may be output via the audio output module 152. The display unit 151 or the audio output module 152 may be classified as part of the alarm unit 153.

The haptic module 154 generates various haptic effects that can be sensed by a user. Vibration is a representative example for a haptic effect generated by the haptic module 154. Strength and pattern of the vibration generated from the haptic module 154 may be controllable. For example, vibrations differing from each other may be output in a manner of being synthesized together or may be sequentially output.

The haptic module 154 may generate various haptic effects including vibration, an effect caused by a stimulus such as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data such as phonebook, message, still picture, and moving picture. The memory 160 may store data of vibration and sound in various patterns output in response to a touch input to the touch screen. The memory 160 may include a buffer temporarily storing data.

The memory 160 may further include at least one of a flash memory, a hard disk, a multimedia card micro type memory, a card type memory such as SD memory or XD memory, a random access memory (RAM), a static random access memory (SRAM), a read-only memory (ROM), an electrically erasable programmable read-only memory, a programmable read-only memory, a magnetic memory, a magnetic disk, an optical disk, and/or the like. Furthermore, the mobile terminal 100 may operate in association with a web storage that performs a storage function of the memory 160 via the Internet.

The interface unit 170 may function as a path to external devices connected to the mobile terminal 100. The interface unit 170 may receive data from an external device. The interface unit 170 may be supplied with power and the power may then be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various types of information for authenticating use of the mobile terminal 100. The identify module may include a user identity module (UIM), a subscriber identity module (SIM), a universal subscriber identity module (USIM) and/or the like. A device provided with the above identity module (hereinafter referred to as an identity device) may be manufactured in the form of a smart card. The identity device may be connected to the mobile terminal 100 via the port.

The interface unit 170 functions as a path for supplying a power to the mobile terminal 100 from a cradle that is connected to the mobile terminal 100. The interface unit 170 functions as a path for delivering various command signals, which are input from the cradle by a user, to the mobile terminal 100. Various command signals input from the cradle or the power may provide a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 188 for multimedia playback. The multimedia module 188 may be implemented within the controller 180 or may be configured separate from the controller 180.

The controller 180 may perform pattern recognizing processing for recognizing a handwriting input performed on the touch screen as a character and/or recognizing a picture drawing input performed on the touch screen as an image. The power supply 190 may receive external or internal power and then supply the power required for operations of the respective elements under control of the controller 180.

Embodiments of the present disclosure explained in the following description may be implemented within a recording medium that can be read by a computer or a computer-like device using software, hardware or combination thereof. According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180 per se.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in the memory 160, and may be executed by the controller 180.

Figure 2A:
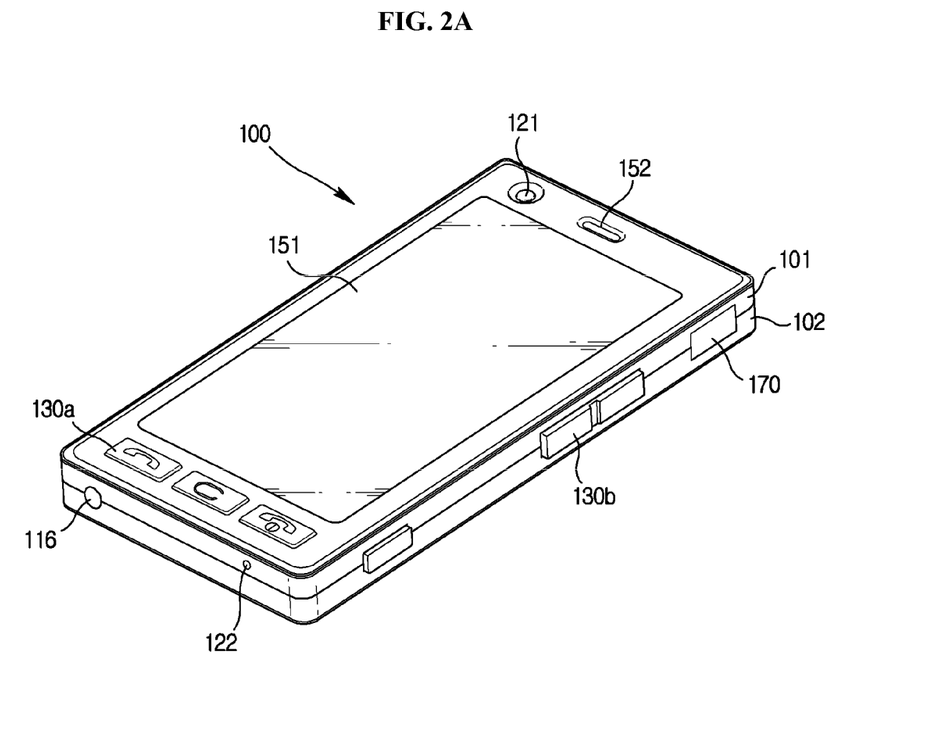
FIG. 2A is a front-view of a mobile terminal according to an embodiment of the present disclosure.

FIG. 2A is a front-view of a mobile terminal 100 according to an embodiment of the present disclosure. Other embodiments, configurations and arrangements may also be provided.

As shown in FIG. 2A, the mobile terminal 100 may include a bar type terminal body. Embodiments of the mobile terminal 100 may be implemented in a variety of different configurations. Examples of such configuration may include a folder-type, a slide-type, a bar-type, a rotational-type, a swing-type and/or combinations thereof.

The body may include a case, such as casing, housing, or cover, that forms an exterior of the mobile terminal 100. The case may be divided into a front case 101 and a rear case 102. Various electric/electronic parts may be provided in a space between the front case 101 and the rear case 102. A middle case may be further provided between the front case 101 and the rear case 102. The cases may be formed by injection molding of synthetic resin or may be formed of metal substance such as stainless steel (STS), titanium (Ti) or the like.

The display unit 151, the audio output unit 152, the camera 121, user input unit 130 including a plurality of manipulation units 130a and 130b, the microphone 122, the interface unit 170 and the like may be provided on the terminal body, and more particularly on the front case 101.

The display unit 151 may occupy most of a main face of the front case 101. The audio output module 152 and the camera 121 may be provided at an area adjacent to one end portion of the display unit 151, while the user input unit 130a and the microphone 122 may be provided at another area adjacent to the other end portion of the display unit 151. At least one of the user input unit 130b and the interface unit 170 may be provided on lateral surfaces of the front and rear cases 101 and 102.

The user input unit 130 may receive a command for controlling an operation of the mobile terminal 100. The plurality of manipulating units 130a and 130b may be called a manipulating portion and may adopt any mechanism of a tactile manner that enables a user to perform a manipulation action by experiencing a tactile feeling.

Contents input by the first manipulating unit 130a or the second manipulating unit 130b may be diversely set. For example, a command such as start, end, scroll and/or the like may be input via the first manipulating unit 130a. A command for adjusting volume of sound outputted from the audio output unit 152, a command for switching to a touch recognizing mode of the display unit 151 or the like may be input via the second manipulating unit 130b.

Figure 2B:
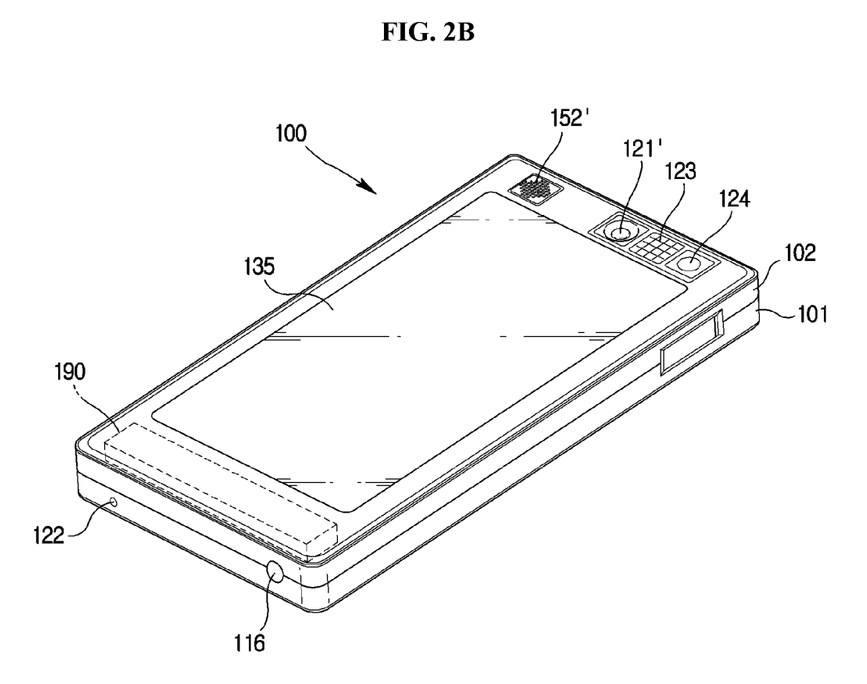
FIG. 2B is a perspective diagram of a backside of the mobile terminal shown in FIG. 2A.

FIG. 2B is a perspective diagram of a backside of the mobile terminal 100 shown in FIG. 2A. Other embodiments, configurations and arrangements may also be provided.

As shown in FIG. 2B, a camera 121' may be additionally provided on a backside of the terminal body, and more particularly on the rear case 102. The camera 121' may have a photographing direction that is substantially opposite to a photographing direction on the front case 101 and may have pixels differing from pixels of the camera 121 shown in FIG. 2A.

For example, the camera 121 on the front case 101 may have a lower number of pixels to capture and transmit a picture of user face for a video call, while the camera 121' on the rear case 101 may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject when photographing the subject using the camera 121'. If a user attempts to take a picture of himself/ herself using the camera 121', the mirror 124 may enable the user to view the user's face reflected by the mirror 124.

An additional audio output unit 152' may be provided on the backside of the rear case 102. The additional audio output unit 152' may implement a stereo function together with the audio output unit 152 shown in FIG. 2A on the front case 101 and may be used for implementation of a speakerphone mode.

A broadcast signal receiving antenna 116 may be additionally provided at the lateral side of the terminal body as well as an antenna for communication or the like (not shown). The antenna 116 may be considered a portion of the broadcast receiving module 111 shown in FIG. 1 and may be retractably provided on the terminal body.

The power supply 190 for supplying power to the mobile terminal 100 may be provided on the terminal body. The power supply 190 may be built within the terminal body. Alternatively, the power supply 190 may be detachably and attachably connected to the terminal body.

FIG. 2B further shows a touchpad 135 on the rear case 102 for detecting a touch that is additionally provided. The touchpad 135 may be configured as a light transmissive type like the display unit 151. If the display unit 151 outputs visual information from both faces, the display unit 151 may recognize visual information via the touchpad 135 as well. The information output from both faces may be controlled by the touchpad 135. Alternatively, a display may be further provided on the touchpad 135 so that a touch screen may also be provided on the rear case 102.

The touchpad 135 may be activated by interconnection with the display unit 151 on the front case 101. The touchpad 135 may be provided behind and parallel to the display unit 151. The touchpad 135 may have a size equal to or smaller than a size of the display unit 151.

Figure 3:
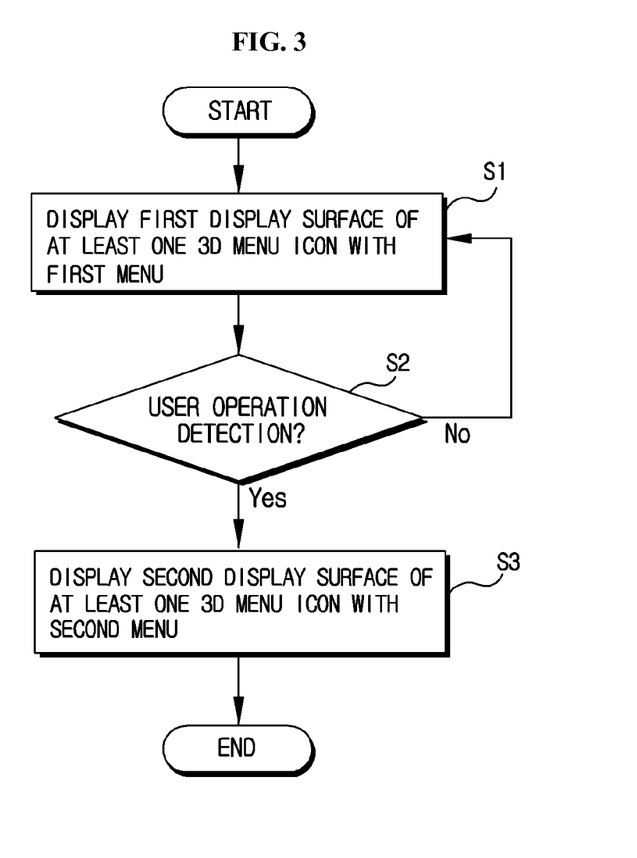
FIG. 3 is a flowchart illustrating a method for displaying a menu in a mobile terminal according to an embodiment of the present disclosure.

A method for displaying a menu in a mobile terminal will be described with reference to FIG. 3. Referring to FIG. 3, at least one 3D menu icon is displayed on the display unit 151 of the mobile terminal 100 (S1). At this time, one surface, for example a first display surface, of each of the at least one 3D menu icon is displayed with a first menu. The first menu may be a widget of wallpaper (screen graphic), or may be an item for executing a specific function. The controller 180 may check whether the sensing unit 140 has generated a user operation detection signal or a user input has been received while the at least one 3D menu icon is displayed on the display unit 151 (S2).

The user operation detection signal may be generated by detecting tapping on the display unit 151 via the touch sensor 142, by detecting rubbing operation on the display unit 151 via the touch sensor 142, or by detecting a moving operation of the mobile terminal 100 via the inclination sensor 143. For example, the moving operation may include a rotating operation of the mobile terminal 100 to one direction within a predetermined period of time at a predetermined angle.

When the user operation detection signal is generated, the controller 180 may control the display unit 151 such that the first display surface of the at least one 3D menu icon is switched to a second display surface of the at least one 3D menu icon to allow a second menu to be displayed (S3). The second menu may include at least one of a bookmark menu, a secret mode menu and a user set-up menu.

According to an embodiment of the present disclosure, the 3D menu icon may be a plate or tile type icon. According to another embodiment of the present disclosure, the 3D menu icon may be a regular hexahedral or dice type 3D menu icon.

In one aspect of the present disclosure, each surface of the 3D menu icon is displayed with a predetermined menu assigned to the surface. When the user operation detection signal is generated, the display surface of the 3D menu icon is switched to another display surface of the 3D menu icon to change the displayed menu such that the user can easily select a desired menu or change to a secret mode menu which may be blank to protect privacy of the user. In another aspect of the present disclosure, at least two 3D menu icons are displayed on the display unit 151 of the mobile terminal 100 such that multiple menus are displayed concurrently.

Figure 4A:
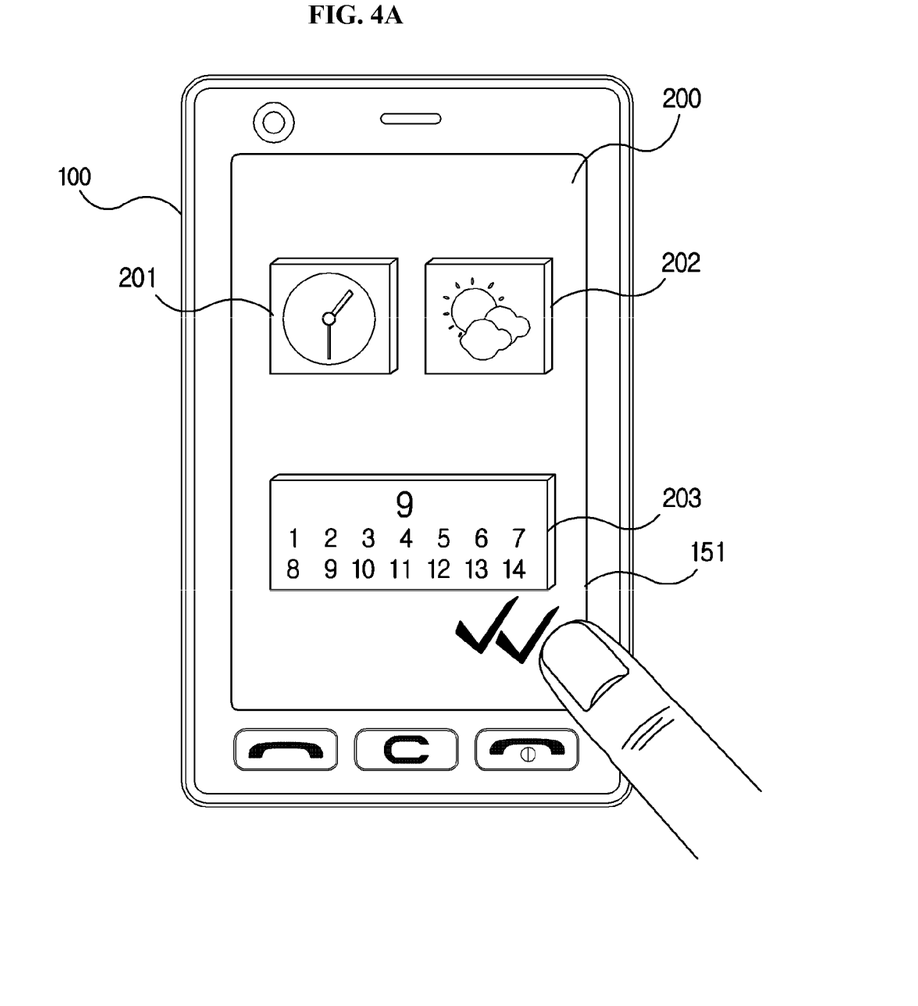
FIGS. 4A, 4B and 4C illustrate displaying a menu in a mobile terminal according to an embodiment of the present disclosure.
Figure 4B:
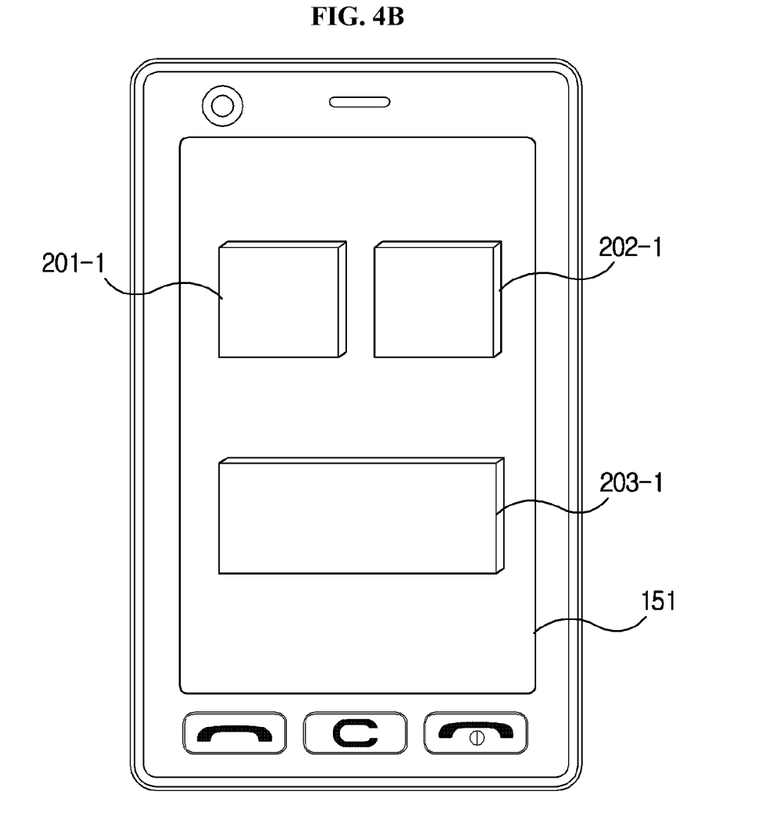
Figure 4C:
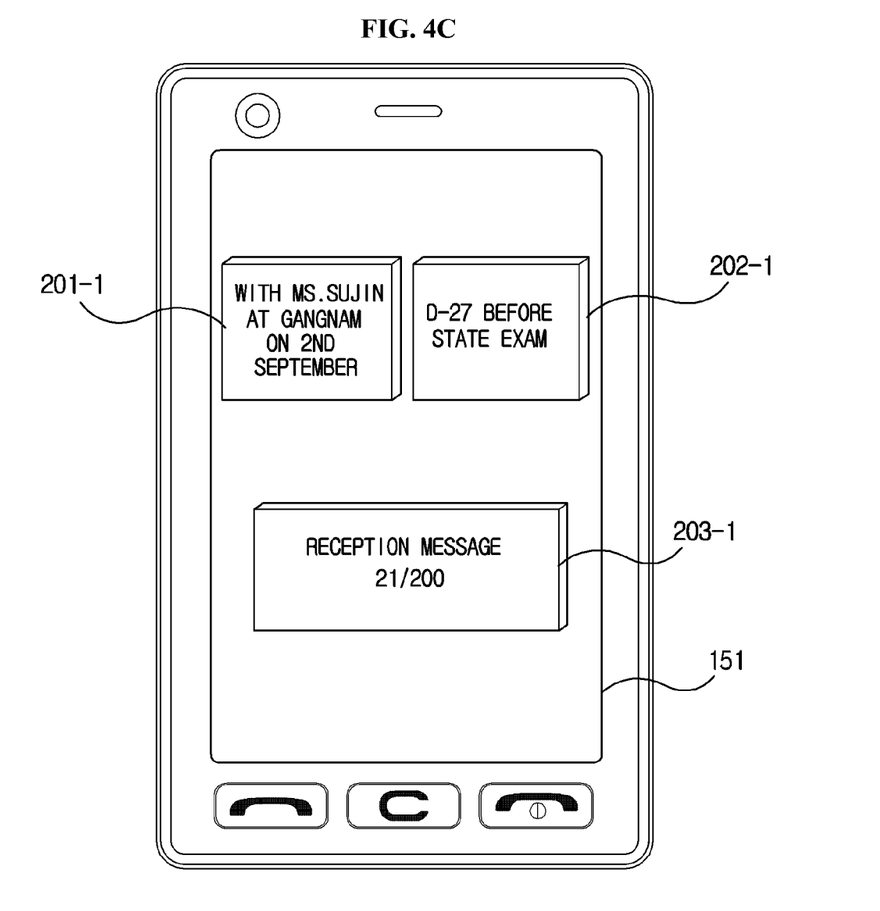
Figure 5A:
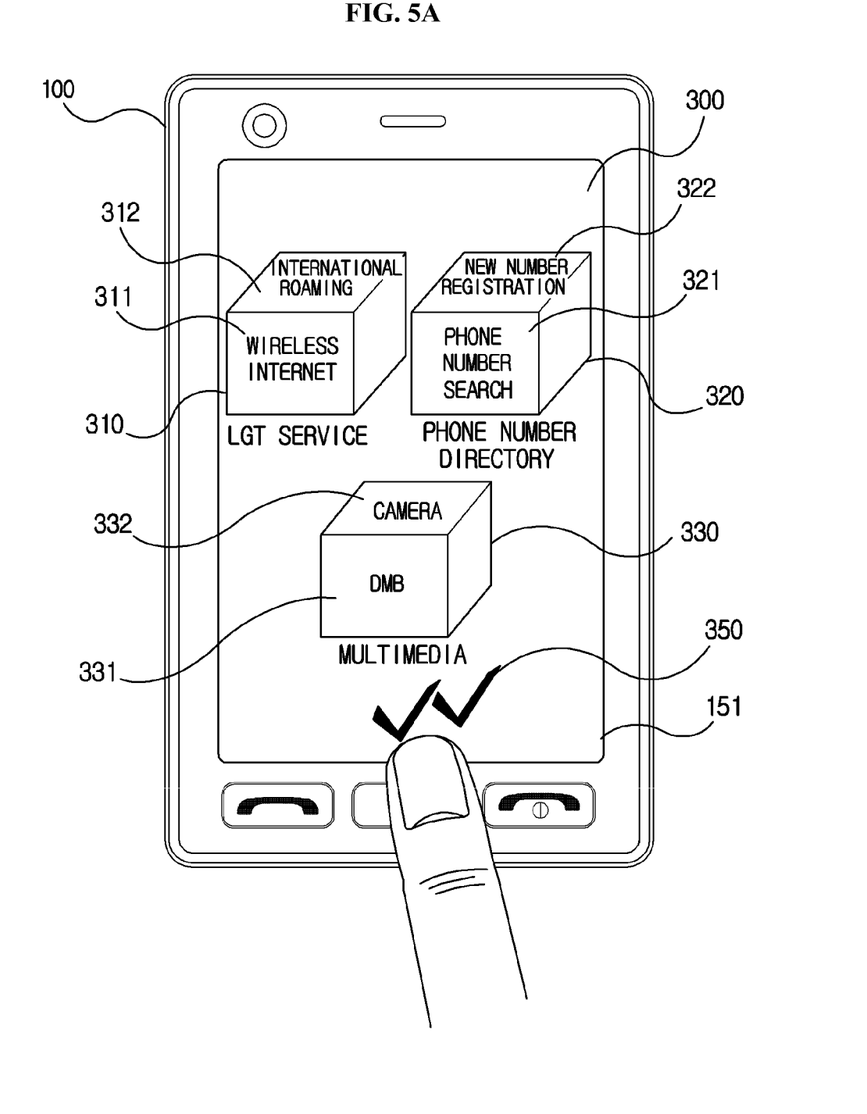
FIGS. 5A, 5B and 5C illustrate displaying a menu in a mobile terminal according to another embodiment of the present disclosure.
Figure 5B:
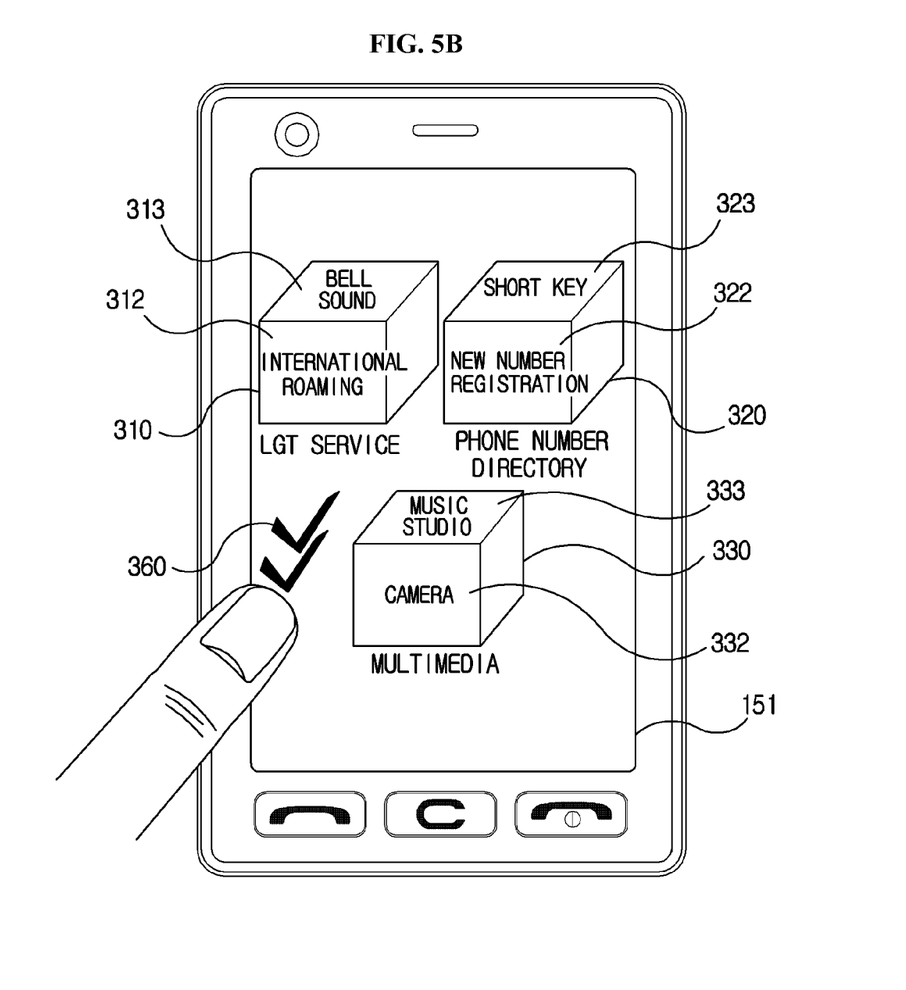
Figure 5C:
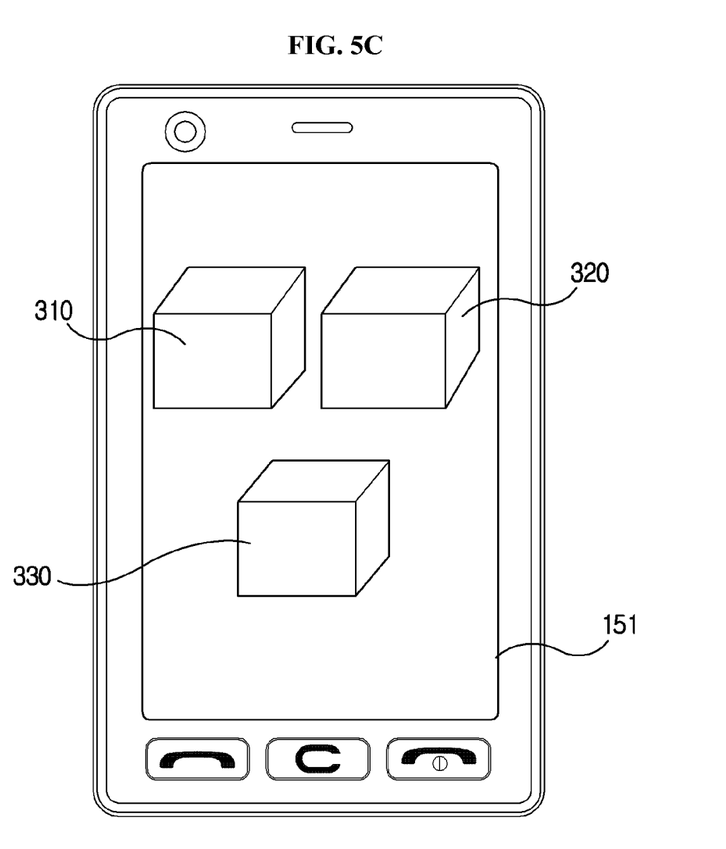

Embodiments of the mobile terminal 100 configured to display a menu as described above will be explained in detail with reference to FIGS. 4A-5C. FIGS. 4A-4C illustrate displaying a menu in the mobile terminal 100 according to an embodiment of the present disclosure. FIGS. 5A-5C illustrate displaying a menu in the mobile terminal 100 according to another embodiment of the present disclosure.

In FIG. 4A, a wallpaper 200 or screen graphic is displayed and the wallpaper 200 is displayed with three tile type 3D menu icons 201-203. The display surface of the first tile type 3D menu icon 201 is displayed with a watch widget 201. The display surface of the second tile type 3D menu icon 202 is displayed with a weather widget 202. The display surface of the third tile type 3D menu 203 is displayed with a calendar widget 203. These icons 201-203 represent the first display surface described above and correspond to the first menus.

When the user taps the display unit 151 or touch screen on which the icons 201-203 are displayed, the controller 180 may control the icons 201-203 such that they are flipped over to allow the rear surfaces 201-1, 202-1, 203-1 or second menus to be displayed, as shown in FIG. 4B. At this time, all icons 201-203 or a specific icon 201, 202, or 203 may be flipped.

For example, in FIG. 4B, all icons 201-203 have been flipped and the second menus that are displayed may be secret mode menus or blank menus. That is, all the tile type 3D menu icons 201-1, 202-1, 203-1 displayed on the wallpaper 200 are blank to protect the user's privacy.

Alternatively, as shown in FIG. 4C, the second menu displayed on the rear surface of each tile type 3D menu icon 201-203 displayed as a result of the flipping may be a user set-up menu. For example, the rear surfaces of the tile type 3D menu icons are displayed as a memo widget 201-1, a D-day widget 202-1 and a reception message widget 203-1. Bookmark menus may replace the second menu and be displayed on each rear surface of the tile type 3D menu icons such that favorite bookmarked menus are displayed.

When a second tapping signal is generated while the second menus or the memo widget 201-1, D-day widget 202-1 and reception message widget 203-1 are displayed on the wallpaper 200, as shown in FIG. 4C, the wallpaper 200 displayed on the display unit 151 may return to the first menus or the watch widget 201, weather widget 202 and calendar widget 203, as shown in FIG. 4A. Alternatively, a menu on an upper surface of each tile type 3D menu icon may be changed in response to the second tapping signal such that a third menu may be displayed instead of the first menu.

While the tapping is used as an example of user input to generate the user operation detection signal, the present disclosure is not so limited. Instead of the tapping, the user input may be a rubbing operation on the touch screen, a flicking operation, a touch and drag operation or rotating operation of the mobile terminal 100.

For example, the user operation detection signal generated by the rotating operation may be detected by the inclination sensor 143. Moreover, an input for controlling display of the 3D menu icon may be received via the user input unit 130.

While all three display surfaces of the 3D menu icons have been changed according to the above described embodiment, the example is not so limited, and only one display surface or two display surfaces of the 3D menu icons may be changed. For example, when the user operation detection signal is generated via the touch sensor 142, the display surfaces of the only one or two display 3D menu icons arranged near the touched position on the display unit 151 or touch screen may be changed. In such embodiment, the touch sensor 142 may be formed at a rear surface of the mobile terminal 100. Alternatively, when the user operation detection signal is generated via the inclination sensor 143, one or two display surfaces of the 3D menu icons may be changed based on the rotating direction. According to the above described embodiment, the user may simply generate a user operation signal to change various menus.

In FIG. 5A, a wallpaper 300 is displayed on the display unit 151. The wallpaper 300 may be displayed with three regular hexahedral 3D menu icons 310, 320, 330. Each of the 3D menu icons 310, 320, 330 corresponds to a main menu. For example, an LGT (LG Telecommunication) service menu 310, a phone number directory menu 320 and a multimedia menu 330 may be displayed with each surface of the 3D menu icons displayed with a sub-menu.

As illustrated in FIG. 5A, one display surface of the 3D menu icon for the LGT service menu 310 shows a wireless Internet menu 311 and another display surface or an upper surface of the 3D menu icon for the LGT service menu 310 shows an international roaming menu 312. Similar to the LGT service menu 310, a phone number search menu 321 of the phone number directory menu 320 and a DMB menu 331 of the multimedia menu 330 are shown on one display surface of each 3D menu icon. An upper surface of the 3D menu icon for the phone may be directory menu 320 is shown with a new number registration menu 322 and an upper surface of the 3D icon for the multimedia menu 330 is shown with a camera menu 332. Each right hand side surface of the 3D menu icons is shown as a blank menu.

In FIG. 5B, when the user taps a lower side surface of the display unit 151 or touch screen, the controller 180 may control the regular hexahedral 3D menu icons 310, 320, 330 to be rotated downwards in response to the tapping signal 350 to allow the upper surfaces 312, 322, 332 to be displayed on the front. The international roaming menu 312, the new number registration menu 322 and the camera menu 332, respectively, become the main or front display surfaces of each 3D menu icon, while a bell sound menu 313, a short key menu 323 and a music studio menu 333 that used to be rear surfaces (not shown in FIG. 5A) become upper surfaces of each 3D menu icon.

In this embodiment, the rotating direction may be determined based on the tapping signal position. In other words, the rotating direction may be different depending on the position of the touch screen on which the tapping occurs.

For example, when a tapping signal 360 is generated on a left hand side surface of the display unit 151, the 3D menu icon is rotated to the left hand side to display a right hand side surface that is blank, as illustrated in FIG. 5C, such that a secret mode menu is displayed. In one aspect of the present disclosure, in response to the tapping signal 360 for selecting the blank menu, all surfaces of the regular hexahedral 3D menu icons on the wallpaper 300 may become blank to protect the user's privacy.

According to the present embodiment, each surface of the hexahedral 3D menu icon is displayed with the pre-set menu. The controller 180, upon receiving the user operation detection signal, changes the display surface by rotating the hexahedral 3D menu icon based on one of the position and direction of the user operation detection signal In this way, the menu that is to be displayed can be changed in response to the user operation detection signal.

Furthermore, the user may flick a specific one of the hexahedral 3D menu icons displayed on the wallpaper 300 to independently rotate the menu displayed on the specific hexahedra (not shown). Therefore, the user may simultaneously generate the tapping signal and the flicking signal for selecting the menu displayed on the hexahedral 3D menu icon to simply change the desired menu.

The method for displaying a menu in a mobile terminal and the mobile terminal performing the method may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

The above-described methods can be implemented in a program recorded medium as computer-readable codes. The computer-readable media may include all types of recording devices in which data readable by a computer system are stored. The computer-readable media include ROM, RAM, CD-ROM, magnetic tapes, floppy discs, optical data storage devices, and the like and also include carrier-wave type implementations (e.g., transmission via Internet).

What is claimed is:

1. A method for displaying a menu in a mobile terminal, the method comprising:
   displaying at least two three-dimensional (3D) menu icons on a display unit, wherein each of the at least two 3D menu icons comprises at least one menu;
   displaying a different menu on a first display surface of each of the at least two 3D menu icons;
   detecting a touch input received via the display unit;
   flipping the displayed at least two 3D menu icons in response to the touch input; and
   displaying a blank menu on a second display surface of each of the flipped at least two 3D menu icons.

2. The method of claim 1, wherein a direction of the flipping is determined based upon a position of the display unit on which the touch input is received.

3. The method of claim 1, further comprising:
   displaying the blank menu on all display surfaces of each of the at least two 3D menu icons in response to the touch input.

4. The method of claim 1, wherein the touch input is received around one of the at least two 3D menu icons.

5. The method of claim 1, wherein the at least two 3D menu icons represent a main menu, and each of the at least two 3D menu icons represents a main menu item of the main menu.

6. The method of claim 1, wherein each of the at least two 3D menu icons is identified by a specific icon or category.

7. The method of claim 1, wherein the at least two 3D menu icons are plate type icons.

8. The method of claim 1, wherein the menu displayed on the first display surface of each of the at least two 3D menu icons comprises a widget related to a specific application that is executed in the mobile terminal.

9. The method of claim 1, further comprising:
receiving, on the display unit, another input for displaying the menu on the first display surface of each of the at least two 3D menu icons; and
re-displaying the menu on the first display surface of each of the at least two 3D menu icons in response to another input.

10. The method of claim 1, wherein the touch input is generated by at least:
tapping on the display unit that is detected by a touch sensor; or
rubbing on the display unit that is detected by the touch sensor.

11. A mobile terminal, comprising:
a display comprising a touch screen and configured to:
  display at least two three-dimensional (3D) menu icons, wherein each of the at least two 3D menu icons comprises at least one menu; and
  display a different menu on a first display surface of each of the at least two 3D menu icons;
a sensing unit configured to detect a touch input received via the touch screen; and
a controller configured to:
  flip the displayed at least two 3D menu icons in response to the touch input; and
  control the display to display a blank menu on a second display surface of each of the flipped at least two 3D menu icons.

12. The mobile terminal of claim 11, wherein the controller is further configured to determine a direction of the flipping based upon a position of the touch screen on which the touch input is received.

13. The mobile terminal of claim 11, wherein the controller is further configured to control the display to display the blank menu on all display surfaces of each of the at least two 3D menu icons in response to the touch input.

14. The mobile terminal of claim 11, wherein the touch input is received around one of the at least two 3D menu icons.

15. The mobile terminal of claim 11, wherein the at least two 3D menu icons represent a main menu, and each of the at least two 3D menu icons represents a main menu item of the main menu.

16. The mobile terminal of claim 11, wherein each of the at least two 3D menu icons is identified by a specific icon or category.

17. The mobile terminal of claim 11, wherein the at least two 3D menu icons are plate type icons.

18. The mobile terminal of claim 11, wherein the menu displayed on the first display surface of each of the at least two 3D menu icons comprises a widget related to a specific application that is executed in the mobile terminal.

19. The mobile terminal of claim 11, wherein:
the sensing unit is further configured to detect another input for displaying the menu on the first display surface of each of the at least two 3D menu icons; and
the controller is further configured to control the display to re-display the menu on the first display surface of each of the at least two 3D menu icons in response to another input.

20. The mobile terminal of claim 11, wherein the touch input is generated by at least:
tapping on the touch screen that is detected by a touch sensor; or
rubbing on the touch screen that is detected by the touch sensor.

* * * * *